No. 765,637.  
Patented July 19, 1904.

UNITED STATES PATENT OFFICE.

ROBERT E. SCHMIDT, OF ELBERFELD, AND PAUL TUST, OF VOHWINKEL, NEAR ELBERFELD, GERMANY, ASSIGNORS TO FARBENFABRIKEN OF ELBERFELD CO., OF NEW YORK, N. Y., A CORPORATION OF NEW YORK.

PROCESS OF MAKING CHRYSAZIN.

SPECIFICATION forming part of Letters Patent No. 765,637, dated July 19, 1904.

Original application filed December 10, 1903, Serial No. 184,670. Divided and this application filed May 18, 1904. Serial No. 208,617. (No specimens.)

*To all whom it may concern:*

Be it known that we, ROBERT E. SCHMIDT, doctor of philosophy, chemist, residing at Elberfeld, Germany, and PAUL TUST, chemist, residing at Vohwinkel, near Elberfeld, Germany, (assignors to the FARBENFABRIKEN OF ELBERFELD COMPANY, of New York,) have invented a new and useful Improvement in Processes of Making Chrysazin; and we hereby declare the following to be a clear and exact description of our invention.

The present application is a divisional application of our application Serial No. 184,670, filed December 10, 1903.

In carrying out our process practically we can proceed as follows, the parts being by weight:

Example 1: In an autoclave provided with a stirrer a mixture of twenty-five parts of the sodium salt of 1.8-anthraquinone disulfonic acid, thirty parts of calcium hydroxid, ($Ca[OH]_2$,) and four hundred parts of water is heated to from 180° to 190° centigrade for about fourteen hours while stirring. After cooling the resulting chrysazin is precipitated from the reaction mass by the addition of hydrochloric acid. It is then isolated by filtration.

Example 2: In an autoclave provided with a stirrer a mixture of ten parts of the potassium salt of 1.8-anthraquinone disulfonic acid, thirty parts of crystallized barium hydroxid, ($Ba[OH]_2$,) and one hundred and fifty parts of water is heated to from 170° to 180° centigrade for about ten hours while stirring. After cooling the resulting chrysazin is precipitated from the reaction mass by the addition of hydrochloric acid. It is then isolated by filtration.

The process proceeds in an analogous manner, if other alkaline earths, such as strontium hydroxid, or if mixtures of these bodies be employed.

Having now described our invention and in what manner the same is to be performed, what we claim as new, and desire to secure by Letters Patent, is—

1. The new process for producing 1.8-dioxyanthraquinone which process consists in first heating an aqueous mixture containing 1.8-anthraquinone disulfonic acid and an alkaline earth, and then separating the resulting 1.8-dioxyanthraquinone from the reaction mass, substantially as hereinbefore described.

2. The new process for producing 1.8-dioxyanthraquinone, which process consists in first heating an aqueous mixture containing 1.8-anthraquinone disulfonic acid and a mixture of alkaline earths, and then separating the resulting 1.8-dioxyanthraquinone from the reaction mass, substantially as hereinbefore described.

3. The new process for producing 1.8-dioxyanthraquinone which process consists in first heating a mixture of 1.8-anthraquinone disulfonic acid with barium hydroxid and water to from 170° to 180° centigrade, secondly acidulating the reaction mass with hydrochloric acid, and finally isolating the resulting 1.8-dioxyanthraquinone from the reaction mixture, substantially as hereinbefore described.

In testimony whereof we have signed our names in the presence of two subscribing witnesses.

ROBERT E. SCHMIDT.
PAUL TUST.

Witnesses:
OTTO KÖNIG,
J. A. RITTERSHAUS.